(12) United States Patent
Komurasaki et al.

(10) Patent No.: US 6,215,284 B1
(45) Date of Patent: Apr. 10, 2001

(54) CONTROL DEVICE OF A.C. GENERATOR FOR VEHICLE

(75) Inventors: Keiichi Komurasaki; Hirofumi Watanabe, both of Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/423,968

(22) PCT Filed: Apr. 9, 1998

(86) PCT No.: PCT/JP98/01646

§ 371 Date: Nov. 17, 1999

§ 102(e) Date: Nov. 17, 1999

(87) PCT Pub. No.: WO99/53596

PCT Pub. Date: Oct. 21, 1999

(51) Int. Cl.[7] .................................. H02P 9/08; H02P 9/10
(52) U.S. Cl. .................................. 322/25; 322/27; 322/28
(58) Field of Search .................................. 322/18, 24, 25, 322/27, 28, 29, 36

(56) References Cited

U.S. PATENT DOCUMENTS

| | | | | |
|---|---|---|---|---|
| 4,388,586 | * | 6/1983 | Lamoth | 323/283 |
| 5,144,220 | * | 9/1992 | Iwatani et al. | 322/28 |
| 5,157,321 | * | 10/1992 | Kato et al. | 322/28 |
| 5,296,798 | * | 3/1994 | Pierret et al. | 322/28 |
| 5,483,146 | * | 1/1996 | Schultz et al. | 322/7 |
| 5,880,577 | * | 3/1999 | Aoyama et al. | 322/29 |
| 5,886,500 | * | 3/1999 | Iwatani et al. | 320/104 |
| 5,982,155 | * | 11/1999 | Rechdan et al. | 322/36 |
| 6,060,866 | * | 5/2000 | Sada et al. | 322/59 |
| 6,121,757 | * | 9/2000 | Takahashi et al. | 322/28 |

FOREIGN PATENT DOCUMENTS

| | | |
|---|---|---|
| 3-173324 | 7/1991 | (JP) . |
| 6-261466 | 9/1994 | (JP) . |
| 7-170672 | 7/1995 | (JP) . |

* cited by examiner

Primary Examiner—Nicholas Ponomarenko
(74) Attorney, Agent, or Firm—Sughrue, Mion, Zinn, Macpeak & Seas, PLLC

(57) ABSTRACT

In a control device of an a.c. generator for a vehicle which is designed in such a way that for a first time right after an engine having been started, an output of the a.c. generator is suppressed to a minimum value, and for a second time following the first time, the output of the a.c. generator is gradually increased from the minimum value up to a maximum value to stabilize the revolution of the engine, the invention is intended to shorten a period of time required to suppress the output of the generator at high temperatures to thereby prevent a reduction in the charging performance of a battery.

At high temperatures, a time interval of a timer 402, to which the first period of time is set, and a discharging time constant of a capacitor 407, which defines the second period of time, are both shortened on the basis of an output a of a temperature sensor 410.

At high temperatures, a detection threshold for a revolution detector 401, on the basis of which the start of the engine is detected, is set to a low level to shorten an initial excitation period of the generator.

4 Claims, 7 Drawing Sheets

CONTROL DEVICE OF A.C. GENERATOR FOR VEHICLE

TECHNICAL FIELD

The present invention relates to control on a vehicular a.c. generator just after the start of an engine which supplies electrical power to an electrical load.

BACKGROUND ART

An a.c. generator for a vehicle is in general driven by an engine through a V belt and the like to convert rotational energy into electrical energy to thereby output the electrical energy thus obtained. In recent years, a generator having a large output has been required as an electrical load on a vehicle increases. However, if the output of the generator increases, then the load torque of the engine which is developed by driving the generator increases all the time. For this reason, in particular, for a period of time in which the explosion and combustion are unstable as right after the engine having been started, the revolution of the engine is liable to be in an unstable state. In addition, upon starting the engine, the generator outputs a maximum output in order to charge a battery which has been over-discharged by activating a starter motor, so that the load imposed on the engine is increased all the more and hence the revolution of the engine is more and more liable to be led into an unstable state. Such a phenomenon is particularly remarkable in the cold time.

Heretofore, in order to solve the inconveniences as described above, a control device has been proposed in Japanese Patent Application Laid-open No. Hei 3-173324, in which for a predetermined period of time after an a.c. generator has started power generation, the conducting rate of a switch connected in series with a field coil is set to a minimum value, whereby the load torque which is generated by driving the generator just after the starting of the engine is perfectly excluded to achieve the stabilization of engine revolution, and also after a lapse of a predetermined time, the setting of the above-mentioned conducting rate is controlled in such a way as to gradually increase from the above-mentioned minimum value up to a maximum value to prevent a drastic increase in the engine load as well as the generation of belt slipping noise in the cold time, and also to prevent the generation of belt slipping noise and a reduction of engine revolution when the generator output is recovered.

Figure 6:
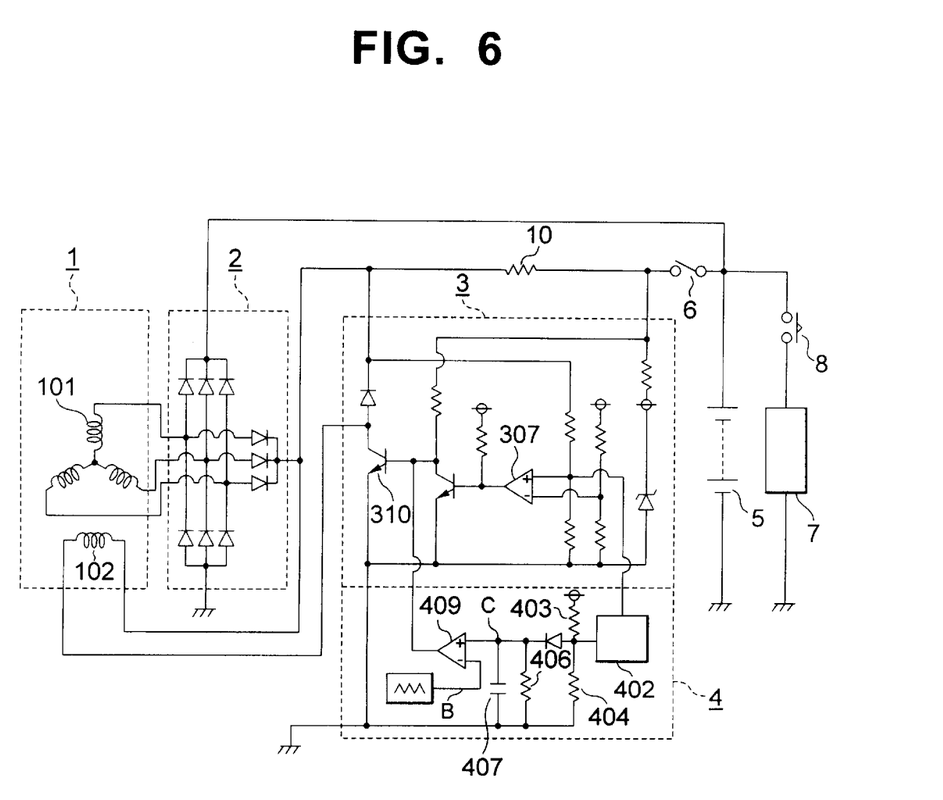
FIG. 6 is a circuit diagram showing one example of a conventional control device of an a.c. generator for a vehicle.
Figure 7:
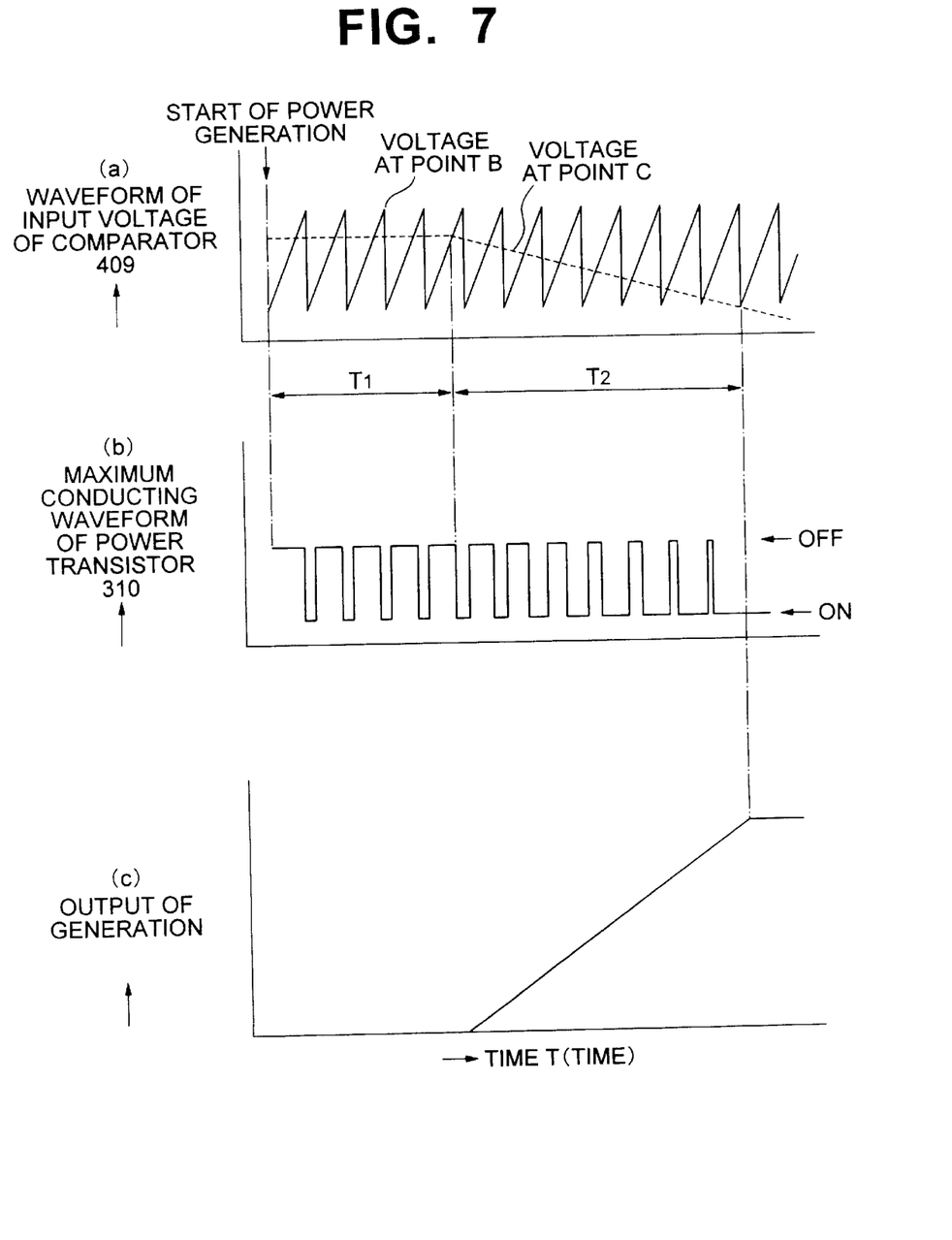
FIG. 7 is a diagram useful in explaining the operation of the control device shown in FIG. 6.

A circuit diagram of such a control device for a vehicular a.c. generator is shown in FIG. 6 and a control characteristic diagram is shown in FIG. 7.

The operation of this control device will hereinafter be described.

Reference numeral 1 designates a generator; reference numeral 2, a rectifier; reference numeral 3, a voltage regulator; reference numeral 4, a field current controller; reference numeral 5, battery; reference numeral 6, a key switch; reference numeral 7, an electrical load applied to a vehicle; reference numeral 8, a switch; and 10, an initial exciting resistor.

Since at a time point when the key switch 6 has been turned on, the generator 1 does not yet start power generation, a comparator 307 of the voltage regulator 3 is in the low state and a timer 402 of the field current controller 4 is also in the low state. Therefore, at this time, a comparator 409 of the field current controller 4 is in the high state and a power transistor 310 is turned on so that an initial exciting current is caused to flow through a field coil 102 via the initial exciting resistor 10. Then, at the time when the generator 1 is driven by the engine to start power generation, the timer 402 becomes the high state to start the measurement of time. For a predetermined period of time T1 in which the timer 402 is in operation, the voltage at a point C is at a level which is set by voltage division resistors 403 and 404.

The relationship between this setting level and a chopping wave signal at a point B is as shown at (a) of FIG. 7, and those signals are compared with each other in a comparator 409 of the field current controller 4, and on the basis of the comparison output, a conducting waveform of the power transistor 310 as shown at (b) of FIG. 7 is obtained. At this time, the conducting rate of the power transistor 310 is at the minimum setting value and the power generation voltage resulting therefrom is made equal to or lower than the voltage of the battery. Therefore, for the predetermined period of time T1, as shown at (c) of FIG. 7, the output of the generator 1 is zero.

Next, at the time when after a lapse of the predetermined period of time T1, the timer 402 becomes the low state, the voltage at point C is multiplied by another predetermined period of time T2 which is set by a time constant circuit comprising a capacitor 407 and a resistor 406 to be decreased down to a predetermined level as shown at (a) of FIG. 7. The conducting waveform of the power transistor 310 which is obtained on the basis of the comparison output of the comparator 409 for this period of time is as shown at (b) of FIG. 7, and hence the conducting rate of the power transistor 310 is gradually increased to reach the maximum value (100%) after a lapse of the predetermined period of time T2. Then, for the predetermined period of time T2, the output of the generator is gradually increased from 0 up to 100% as indicated by a solid line at (c) of FIG. 7. Thereafter, the operation proceeds to the original control based on the comparison output of the comparator 307 of the voltage regulator 3.

In this prior art, the period of time T1, in which the load torque generated by driving the generator right after the engine having been started is removed to stabilize the revolution of the engine, and the period of time T2, following the period of time T1, in which the output of the generator is gradually increased up to 100%, are both made to the fixed values, respectively.

However, such control on the generator is required only at low temperatures and hence it is unnecessary at high temperatures because the startability of the engine is better at hot time than at cold time.

If, however, the generator is controlled at high temperatures, the output of the generator is suppressed right after the engine having been started, so the battery 5 is discharged, thus resulting in a reduction of the charging performance thereof. This is undesirable.

Therefore, it is preferable that at high temperatures, the period of time T1 in which the output of the generator is suppressed and the period of time T2 in which the output of the generator is gradually increased are both shortened to speedily increase the output of the generator up to 100%.

In addition, while for a period of time required to detect the start of the engine (for a period of time in which the revolution of the engine is equal to or lower than a threshold), i.e., during an initial excitation period, the output of the generator is suppressed to the low level to make the load applied to the battery small, it is preferable that the initial excitation period be shortened since the startability of the engine is better at hot time.

DISCLOSURE OF THE INVENTION

An object of the present invention is to shorten, in a control device of an a.c. generator for a vehicle which is designed such that the output of a generator is suppressed to a minimum value for a fixed period of time right after the starting of an engine with the output of the generator being then gradually increased up to a maximum value, at least one of a period of time in which the generator output is made to a minimum value and another period of time in which the generator output at high temperatures is gradually increased to prevent a reduction in the charging performance of a battery.

In addition, another object of the present invention is to set both of a period of time in which the generator output after engine starting is made to a minimum value and another period of time in which the generator output at low temperatures is gradually increased up to a maximum value, to a long period in order to exclude the load torque generated by driving the generator, thereby stabilizing the revolution of the engine.

A further object of the present invention is to set, in a control device of an a.c. generator for a vehicle in which a field current is suppressed to an initial exciting current to prevent the discharge of battery until the rpm of an engine reaches a threshold, and in which the field current is made to a minimum value to suppress the output of the generator for a first period of time after the rpm of the engine has reached the threshold, and in which the output of the generator is gradually increased up to a maximum value for a second period of time following the first period of time, a threshold level, on the basis of which the rpm of the engine is detected, to a small value at high temperatures so as to shorten an initial excitation period.

A control device of an a.c. generator for a vehicle according to the present invention includes: an a.c. generator having a field coil; a rectifier for rectifying an a.c. output of the a.c. generator; a battery connected to an output terminal of the rectifier; a voltage regulator having a switch for controlling a current flowing through the field coil and serving to detect a terminal voltage of the rectifier to intermittently control the field current by means of the switch to regulate an output voltage of the a.c. generator at a predetermined value; and a field current controller for controlling a conducting rate of the switch to a minimum setting value for a first period of time after the a.c. generator has started power generation, said controller being operable to gradually increase a setting value of the conducting rate from the minimum setting value up to a maximum setting value for a second period of time and to shorten at least one of the first period of time and the second period of time when the temperature is equal to or higher than a fixed value.

Since at high temperatures, at least one of the first period of time to suppress the generator output to the minimum value and the second period of time to gradually increase the generator output up to the maximum value is shortened, it is possible to prevent a reduction in the charging performance of the battery at high temperatures.

The control device of an a.c. generator for a vehicle preferably shortens both of the first period of time in which the generator output is suppressed to the minimum value and the second period of time in which the generator output is gradually increased up to the maximum value at high temperatures. Since both of the first period of time and the second period of time are shortened as described above, the effect is further increased that the time to suppress the generator output can be shortened and the reduction in the charging performance of the battery can be prevented.

Moreover, a control device of an a.c. generator for a vehicle according to the present invention relates to a control device including: an a.c. generator having a field coil; a rectifier for rectifying an a.c. output of the a.c. generator; a battery connected to an output terminal of the rectifier; a voltage regulator having a switch for controlling a current flowing through the field coil and serving to detect a terminal voltage of the rectifier to intermittently control the field current by means of the switch to regulate an output voltage of the a.c. generator at a predetermined value; and a field current controller for controlling a conducting rate of the switch in such a way to make the field current to an initial exciting current until the start of an engine has been detected, to make the conducting rate of the switch to a minimum setting value for a first period of time after detection of the engine starting, to gradually increase the setting value of the conducting rate from the minimum setting value up to a maximum setting value for a second period of time, and to set a threshold of the engine rpm for detecting the start of the engine to a low level when the temperature is equal to or higher than a fixed value.

By setting the threshold of the engine rpm used for detecting the start of the engine to the low level at high temperatures, an initial excitation period is shortened and the discharge of the battery is suppressed.

Furthermore, a control device of an a.c. generator for a vehicle according to the present invention relates to a control device including: an a.c. generator having a field coil; a rectifier for rectifying an a.c. output of the a.c. generator; a battery connected to an output terminal of the rectifier; a voltage regulator having a switch for controlling a current flowing through the field coil and serving to detect a terminal voltage of the rectifier to intermittently control the field current by means of the switch to regulate an output voltage of the a.c. generator at a predetermined value; and a field current controller for controlling a conducting rate of the switch in such a way to make the field current to an initial exciting current until the start of an engine has been detected, to make the minimum setting value to the conducting rate of the switch for a first period of time after detection of the start of the engine, to gradually increase a setting value of the conducting rate from the minimum setting value up to a maximum setting value for a second period of time, and to set a threshold for the engine rpm for detecting the start of the engine to a low level and also to shorten both of the first period of time and the second period of time when the temperature is equal to or higher than a fixed value.

By setting the threshold for the engine rpm for detecting the start of the engine to the low level at high temperatures, an initial excitation period can be shortened and the discharge of the battery can be prevented.

Since at high temperatures both of the first time and the second time are shortened, in addition to the above, the time required to suppress the output of the generator can be shortened and also the reduction in the charging performance of the battery can be prevented.

BRIEF DESCRIPTION OF THE INVENTION

BEST MODE FOR CARRYING OUT THE INVENTION

Next, a control device of an a.c. generator for a vehicle according to the present invention will hereinafter be described with reference to the accompanying drawings.

Embodiment 1

Figure 1:
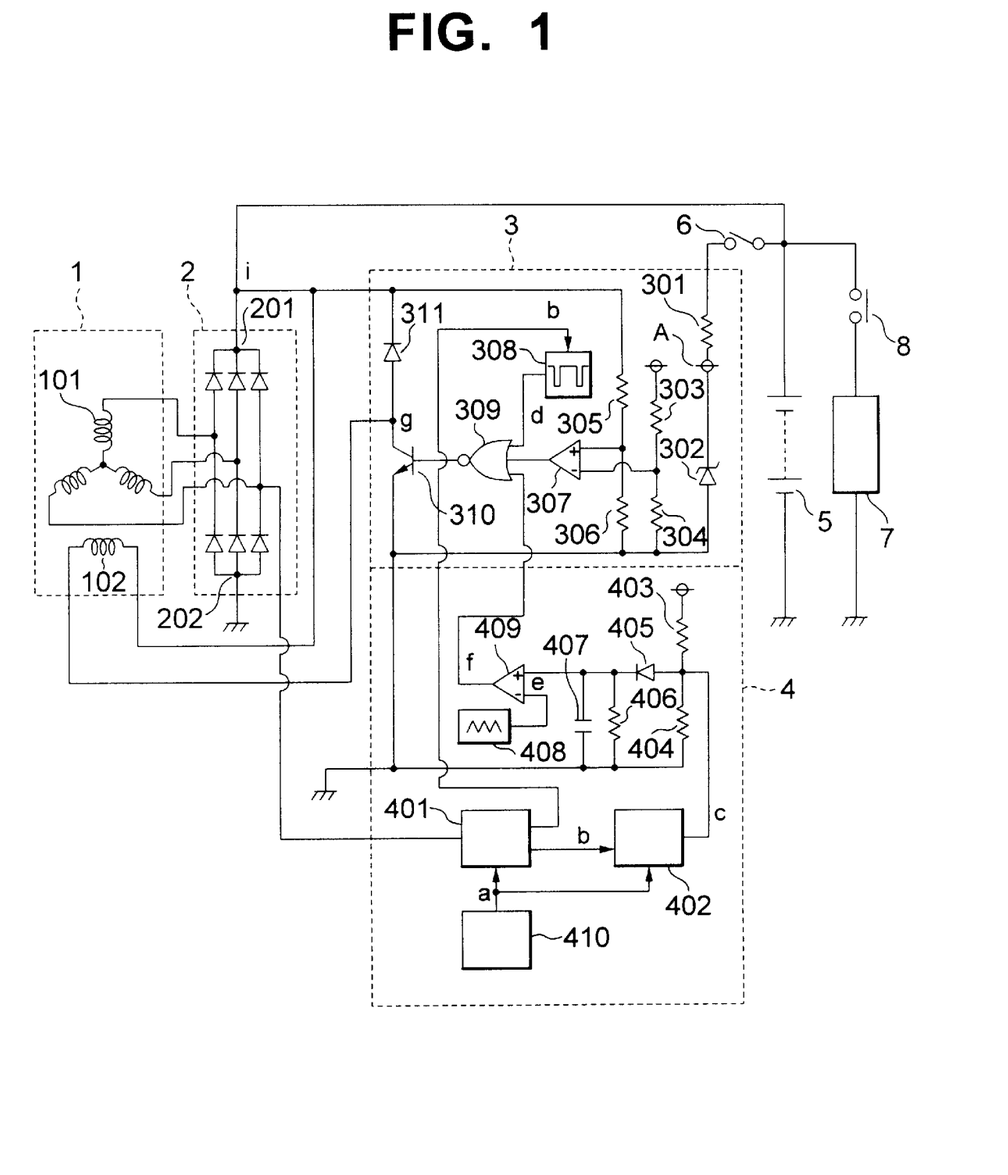
FIG. 1 is a circuit diagram showing one embodiment of a control device of an a.c. generator for a vehicle according to the present invention.
Figure 2:
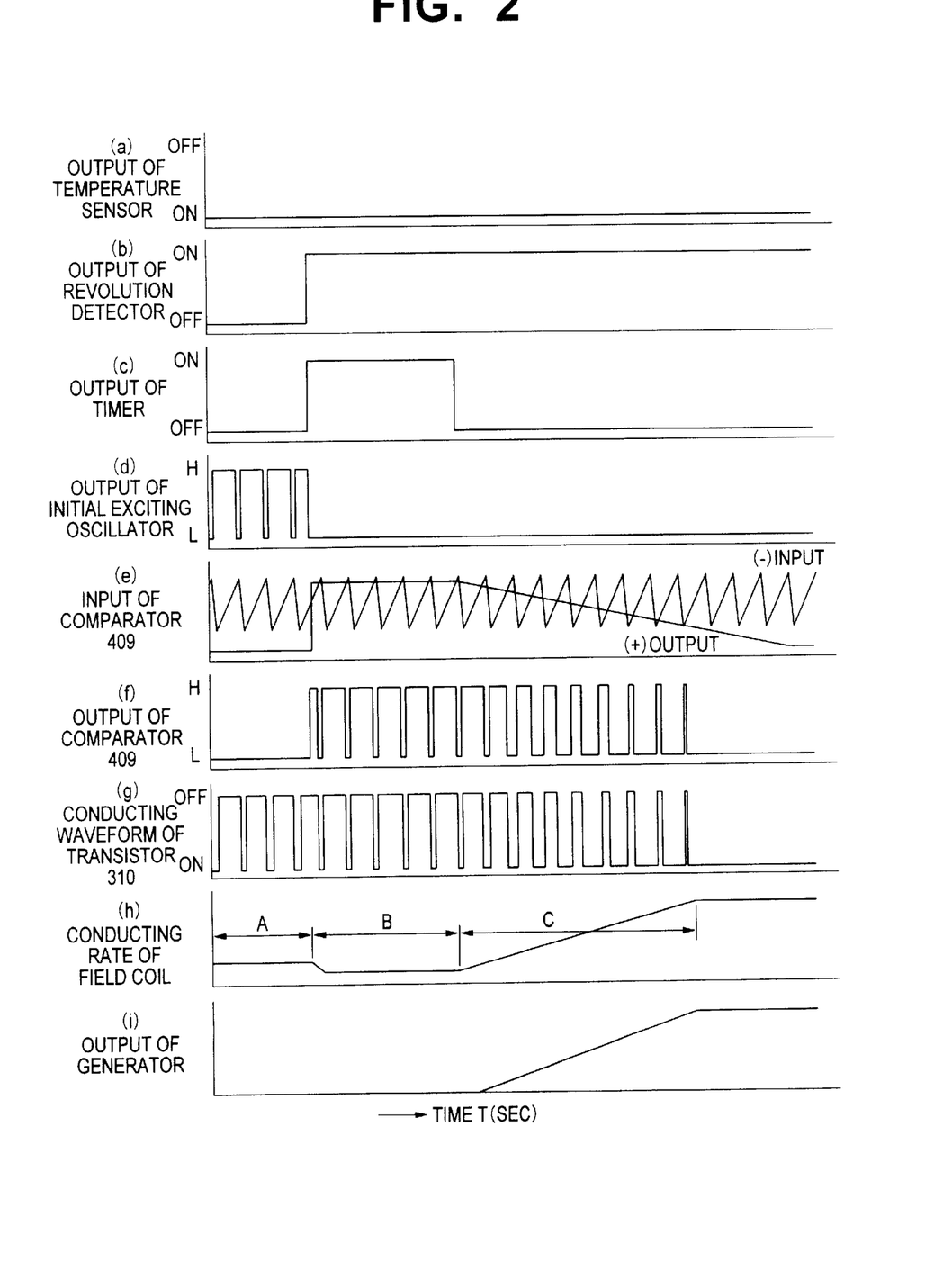
FIG. 2 is a diagram useful in explaining the operation of the control device shown in FIG. 1 at low temperatures.
Figure 3:
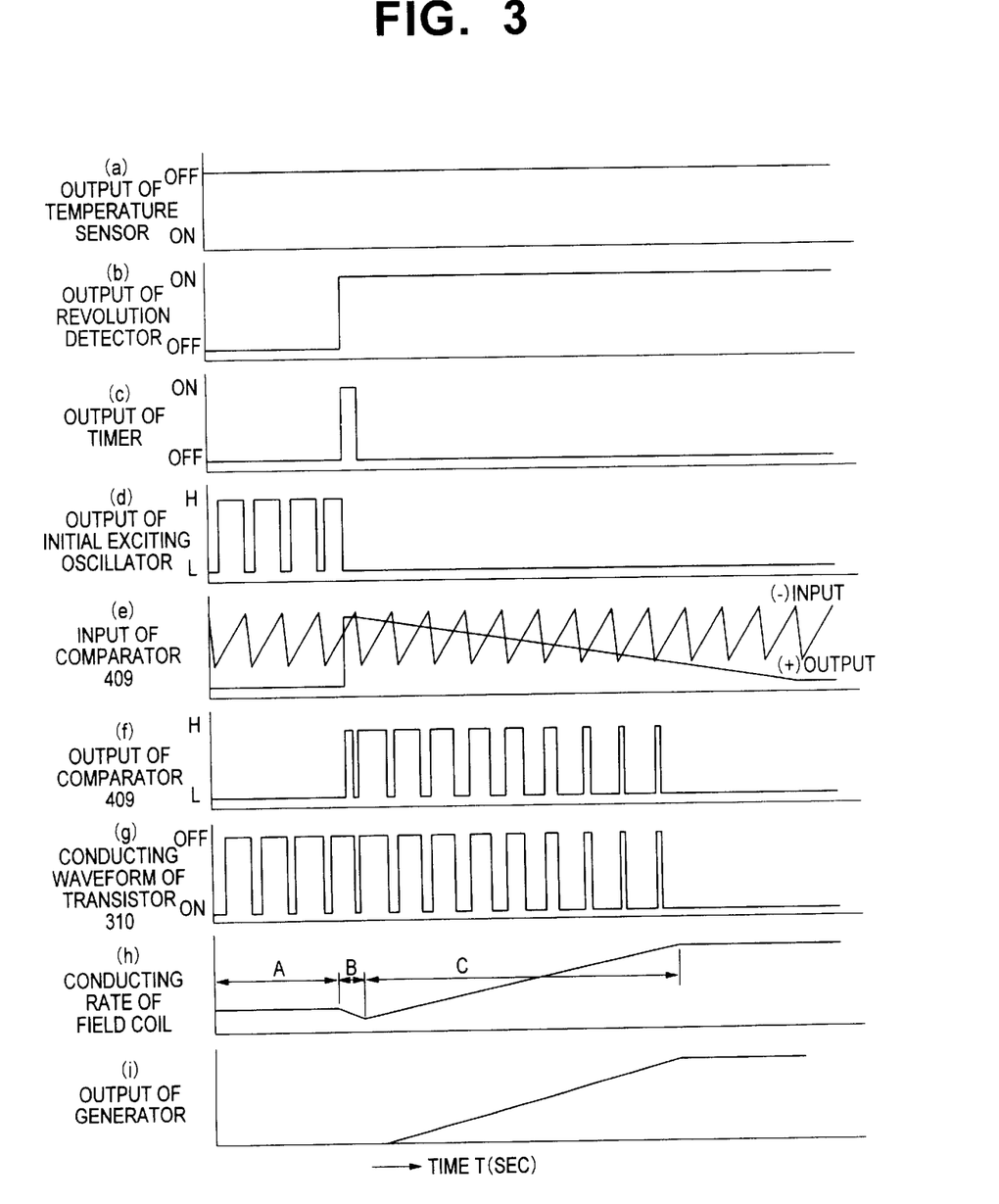
FIG. 3 is a diagram useful in explaining the operation of the control device shown in FIG. 1 at high temperatures.

FIG. 1 is a circuit diagram showing one embodiment of a control device of an a.c. generator for a vehicle according to the present invention, and FIG. 2 is a timing chart showing the operation at a to i of the circuit shown in FIG. 1 at low temperatures. FIG. 3 is a timing chart showing the operation at a to i of the circuit shown in FIG. 1 at high temperatures.

In FIG. 1, reference numeral 1 designates an a.c. generator which has armature coils 101 and a field coil 102, and which is connected to a rectifier 2. The rectifier 2 has an output terminal 201 and a ground terminal 202.

Reference numeral 3 designates a voltage regulator of the control device of the present invention, and reference numeral 4 designates a power generation controlling unit. Reference symbol A designates a constant voltage supply which includes a resistor 301 and a Zener diode 302, and which acts as a power supply for the control device.

Reference numeral 307 designates a comparator for detecting an output voltage of the generator. The comparator 307 compares an electric potential, which is obtained by dividing the power generation voltage of the generator with resistors 305 and 306, with a voltage division potential which is obtained with resistors 303 and 304 as a reference. Then, the comparator 307 outputs an output signal at the high (H) level when the voltage division potential of the generator is higher than the reference voltage, whereas it outputs an output signal at the low (L) level when the voltage division potential is lower than the reference voltage. Alternatively, however, instead of detecting the output voltage of the generator, the voltage of the battery 5 may be detected. Reference numeral 308 designates an initial exciting oscillator for the generator which serves to output a rectangular wave which has a fixed frequency and a fixed duty.

Reference numeral 310 designates a power transistor for intermittently controlling the field coil, and reference numeral 309 designates a NOR gate as a driver for the power transistor. Then, the NOR gate 309 outputs an output signal at the high level when all of the inputs thereto are at the "L" level to turn on the power transistor, whereas it outputs an output signal at the low level when any one of the inputs thereto is at the high level to turn off the power transistor. Reference numeral 311 designates a diode which is connected in parallel with the field coil for absorbing a surge when breaking the field coil. Reference numerals 403 and 404 respectively designate voltage division resistors with which the charging potential of a capacitor 407 is determined, reference numeral 405 designates a diode for preventing a reverse voltage from being applied across the capacitor 407, reference numeral 406 designates a discharging resistor for the capacitor 407, and reference numeral 408 designates a PWM rectangular wave generator which is connected, together with the capacitor 407, to a PWM comparator 409.

Reference numeral 401 designates a revolution detector to which a one-phase half wave of the a.c. generator 1 is inputted and which serves to detect the revolution of the a.c. generator 1 to indirectly judge the revolution of the engine as a driving source. An output of the revolution detector 401 becomes the high level (ON) when the detected revolution is equal to or larger than a predetermined revolution. The output terminal of the revolution detector 401 is connected to both of the initial exciting oscillator 308 and a timer 402. In addition, the judged revolution is changed on the basis of an input signal to a temperature sensor.

Reference numeral 402 designates the timer which is turned on by the output of the revolution detector 401 as a trigger, and is turned off after a lapse of a predetermined period of time. An output of the timer is connected to a voltage division point between the resistors 403 and 404. In addition, the predetermined period of time is changed on the basis of the input signal to the temperature sensor.

Reference numeral 410 designates the temperature sensor which is provided in the control device. An output of the temperature sensor becomes the high level (ON) when the detected temperature is equal to or lower than a predetermined temperature, whereas it becomes the low level (OFF) when the detected temperature is equal to or higher than the predetermined temperature. The output terminal of the temperature sensor is connected to both of the revolution detector 401 and the timer 402.

Reference numeral 5 designates a battery of a vehicle, reference numeral 6 designates a key switch, reference numeral 7 designates an electrical load applied to the vehicle, reference numeral 8 designates a switch for the electrical load, and reference numeral 10 designates an initial exciting resistor.

Next, a description will hereinbelow be given with respect to the operations of the respective portions a to i of the circuit shown in FIG. 1 at low temperatures as well as at high temperatures with reference to timing charts of FIGS. 2 and 3.

Parts (a) to (i) of FIG. 2 are respectively waveform charts at the portions a to i at low temperatures.

Parts (a) to (i) of FIG. 3 are respectively waveform charts at the portions a to i at high temperatures.

In FIG. 2, since the temperature is equal to or lower than a predetermined value, the temperature sensor 410 outputs an "ON" signal a to set both of the revolution detector 401 and the timer 402 to a low temperature state. That is, in this case, a threshold for the engine rpm, on the basis of which the revolution detector 401 detects the start of the engine, is set to the high level (equal to or higher than the perfect explosion revolution during the start of the engine, e.g., 1,500 rpm in terms of the generator) and also a time constant T1 of the timer 402 is set to a large value. The output of the timer 402 is held "OFF" ((c) of FIG. 2) until the start of the engine is detected by the revolution detector 401. As a result, the voltage division point between the resistors 403 and 404 is grounded, the potential of the capacitor 407 is decreased, a positive input of the comparator 409 is grounded through the resistor 406 ((e) of FIG. 2), and the output of the comparator 409 becomes the low level ((f) of FIG. 2).

While the output of the revolution detector 401 is held in the "OFF" state ((b) of FIG. 2), the timer 402 is in the reset "OFF" state and the initial exciting oscillator 308 is in the operating state ((d) of FIG. 2).

The operation of the transistor 310 when the engine rpm is equal to or lower than the threshold on the basis of which the engine revolution is detected by the revolution detector 401 in a state before engine starting depends on the operation of the initial exciting oscillator 308, and hence is in the initial exciting state ((g) of FIG. 2). At this time, since the output of the generator 1 is lower than the reference voltage, the output of the comparator 307 is at the low level. In addition, the output f of the comparator 409 is also at the low level. Therefore, for a period of time in which the output d of the initial exciting oscillator 308 is at the low level, the output of the NOR gate 309 becomes the high level to turn on the transistor 310 ((g) of FIG. 2).

If the key switch 6 is left "ON", then there is a possibility that the battery 5 may be discharged. In order to prevent this possibility, in the state in which the key switch 6 is in the "ON" state and the engine is not yet started, the field current of the generator I acting as a load for the battery 5 is chopped by the transistor 310 to suppress the output of the generator to about one fifth. This is the initial exciting state and corresponds to a period of time A in (h) of FIG. 2.

Next, at the time when the engine has been started and the rpm thereof exceeds the threshold, the output of the revolution detector 401 becomes the high level (ON) ((b) of FIG. 2) whereby the operation of the initial exciting oscillator 308 is stopped ((d) of FIG. 2) and the time 402 is caused to start counting.

At the time when the output of the timer 402 becomes the high level (ON) ((c) of FIG. 2), the voltage division point between the resistors 403 and 404 is released so that the capacitor 407 is charged up to the voltage division potential which is obtained by the voltage division with the resistors 403 and 404. That potential is set to a level which is slightly lower than a peak value of the triangular wave input to a negative input terminal of the comparator 409 and hence the rate at which the output of the comparator 409 becomes the low level (L) will be in the range of 10 to 15% ((f) of FIG. 2).

The operation of the transistor 310 is switched over from the "ON" duty which is determined by the initial exciting oscillator 308 to the "ON" duty which is determined by the comparator 409. Thus, that "ON" duty changes from about 20% which is determined by the initial exciting oscillator 308 to the range of 10 to 15% as described above ((g) of FIG. 2).

The value of the duty of 10 to 15% is set such that the output voltage of the generator 1 does not exceed the voltage of the battery 5, i.e., a minimum value below which the generator 1 generates no output.

Next, at the time when the time constant T1 of the timer 402 has elapsed so that the set time is up, the output of the timer 402 becomes the low level (OFF) ((c) of FIG. 2), the voltage division point between the resistors 403 and 404 is grounded, the capacitor 407 starts discharging through the resistor 406, and the potential at the positive input of the comparator 409 is decreased ((e) of FIG. 2). The decrease in the potential at the positive input results in that the rate at which the output of the comparator 409 ((f) of FIG. 2) becomes the low state, i.e., the conducting (ON) rate of the transistor 310 is gradually increased ((g) of FIG. 2). The above-mentioned operation will hereinbelow be described with reference to the conducting rate of the field coil shown in (h) of FIG. 2, i.e., the conducting rate of the transistor 310 and the output of the generator shown in (i) of FIG. 2.

The field current of the generator 1 is caused to flow at a first conducting rate of the initial excitation region A when the engine is started but the rpm thereof is equal to or lower than a predetermined threshold, whereas it is caused to flow at a second conducting rate of a region B which is slightly lower than the first conducting rate of the initial excitation region A when the engine rpm is equal to or higher than the predetermined threshold. In addition, since in the regions A and B, the power generation voltage of the generator is set in such a way as to become equal to or lower than the voltage of the battery 5, the generator does not generate any output at all.

Next, after a first period of time (corresponding to the time constant T1 of the timer 402) of the power generation cut region B has elapsed, the conducting rate of the field coil is gradually increased from the minimum value to reach a gradually increasing region C, so that the generator starts to generate an output with the value thereof gradually increasing for a second period of time (corresponding to a time constant T2 which is determined on the basis of the capacitance of the capacitor 407 and the resistance value of the resistor 406) to suppress a drastic change in the load applied to the engine due to the output of the generator. Thereafter, the control device carries out the normal voltage control.

As described above, when the engine is started at low temperatures, the first period of time, in which the output voltage of the generator is made to the minimum value, and the second period of time, in which the output voltage of the generator is thereafter gradually increased up to the maximum value, are both set to the relatively long times so that the revolution of the engine can be stabilized and the starting performance can be improved.

FIG. 3 shows the operation when the temperature is equal to or higher than the predetermined value. The output of the temperature sensor 410 becomes the low level (OFF) ((a) of FIG. 3) and the detection threshold of the revolution detector 401, which detects the start of the engine, is set to the lower value (in the present example, corresponding to 800 rpm in terms of the generator) than that at low temperatures. In addition, the time constant T1 of the timer 402 is also set to a shorter time than that at low temperatures (in the present example, about one tenth).

Since the detection threshold of the revolution detector 401 is set to the low level, the timing becomes early at which the output d of the initial exciting oscillator 308 is made to the low level (OFF) by means of the output b of the revolution detector 401. As a result, the period of time required to supply the initial exciting current as the field current of the generator 1 is shortened (shown in the region A in (h) of FIG. 3). The operations of the respective portions in the initial excitation state are the same as those of FIG. 2 excepting that the respective period of times there for are shortened.

Next, at the time when the engine has been started and the rpm thereof becomes equal to or higher than the detection threshold of the revolution detector 401, the output b of the revolution detector 401 becomes the high level (ON) ((b) of FIG. 3), and the output of the initial exciting oscillator 308 is made to the low level to complete the initial exciting period of time ((d) of FIG. 3). In addition, the output of the timer 402 becomes the high level to start its counting operation ((c) of FIG. 3). As a result, the voltage developed across the capacitor 407 is increased and is applied to the positive input terminal of the comparator 409 ((e) of FIG. 3)

so that the conducting period of time g of the transistor 310 is controlled on the basis of the output f of the comparator 409 ((f) and (g) of FIG. 3).

Since the time constant T1 of the timer 402 at high temperatures is set to about one tenth of that at low temperatures, the time for the timer 402 is up for a short time, so the output of the timer 402 is turned to the low level, thus completing the power generation cut region B. As a result, the voltage developed across the capacitor 407 is attenuated in accordance with the time constant T2 which is determined by both of the capacitance of the capacitor 407 and the resistance value of the resistor 406, and the voltage at the positive input terminal of the comparator 409 is also attenuated in dependence upon the attenuation of the capacitor voltage ((e) of FIG. 3). Consequently, the period of time in which the output f of the comparator 409 is at the low level is gradually increased ((f) of FIG. 3) and along with this, the period of time in which the transistor 310 is held at the "ON" state is also gradually increased from the minimum value up to the maximum value ((g) of FIG. 3). Thus, the conducting rate of the field current of the generator 1 is also gradually increased from the minimum value up to the maximum value ((h) of FIG. 3), and the output of the generator is also increased from the minimum value up to the maximum value so as to follow that gradual increase ((i) of FIG. 3).

Describing the above-mentioned operation in terms of the conducting rate of the field coil ((h) of FIG. 3) and the output of the generator ((i) of FIG. 3), upon detection of the predetermined revolution (rpm) of the generator, the conducting rate of the field coil passes immediately from the initial exciting region A through the very short power generation cut region B to the gradually increasing region C.

Embodiment 2

Figure 4:
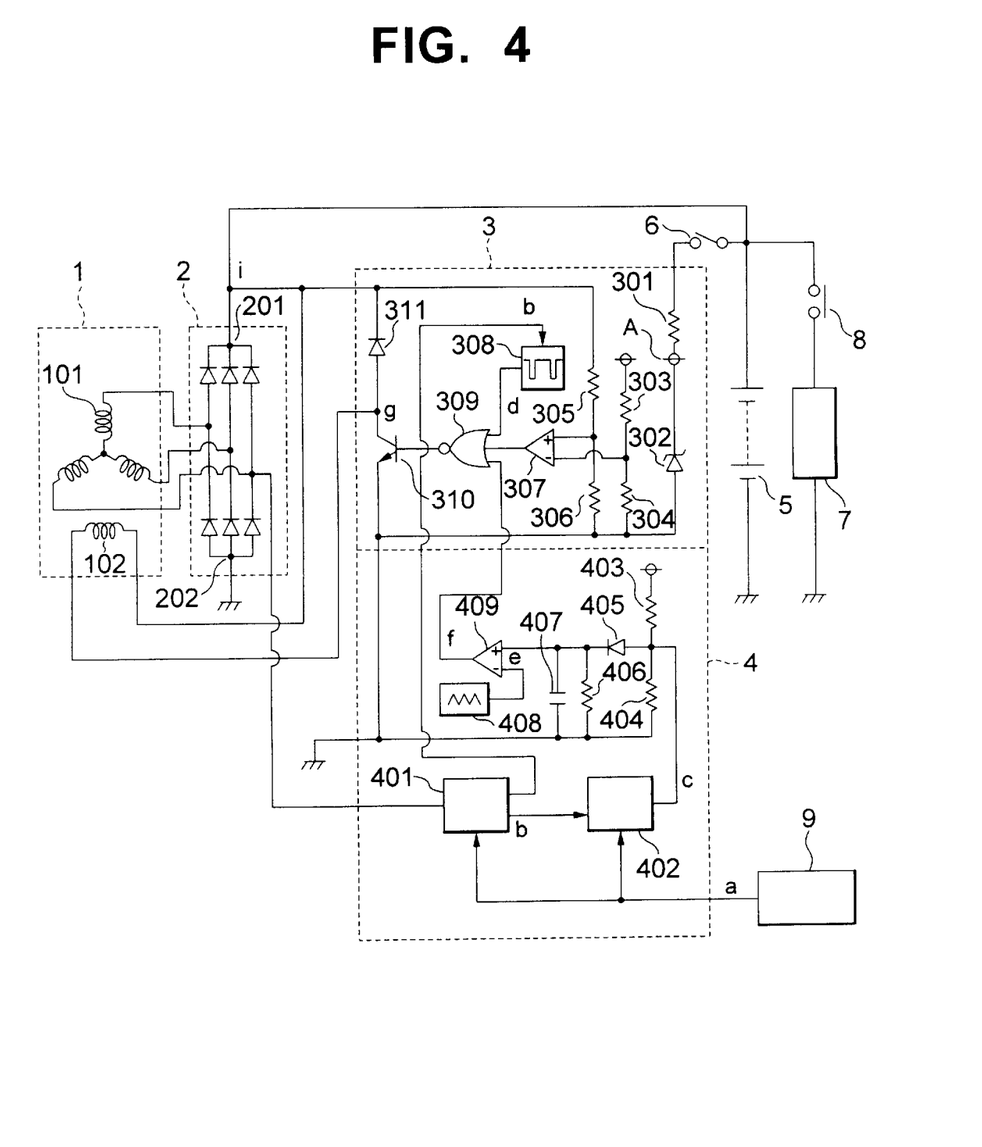
FIG. 4 is a circuit diagram showing another embodiment of a control device of an a.c. generator for a vehicle according to the present invention.

FIG. 4 is a circuit diagram showing another embodiment of a control device of an a.c. generator for a vehicle according to the present invention.

In FIG. 4, reference numeral 9 designates a temperature sensor which is mounted to the outside of the generator, e.g., a part of the engine. The operation of the temperature sensor 9 is the same as that of the temperature sensor 410 shown in FIG. 1. The operating timing of the circuit shown in FIG. 4 is the same as those of FIGS. 2 and 3.

Embodiment 3

Figure 5:
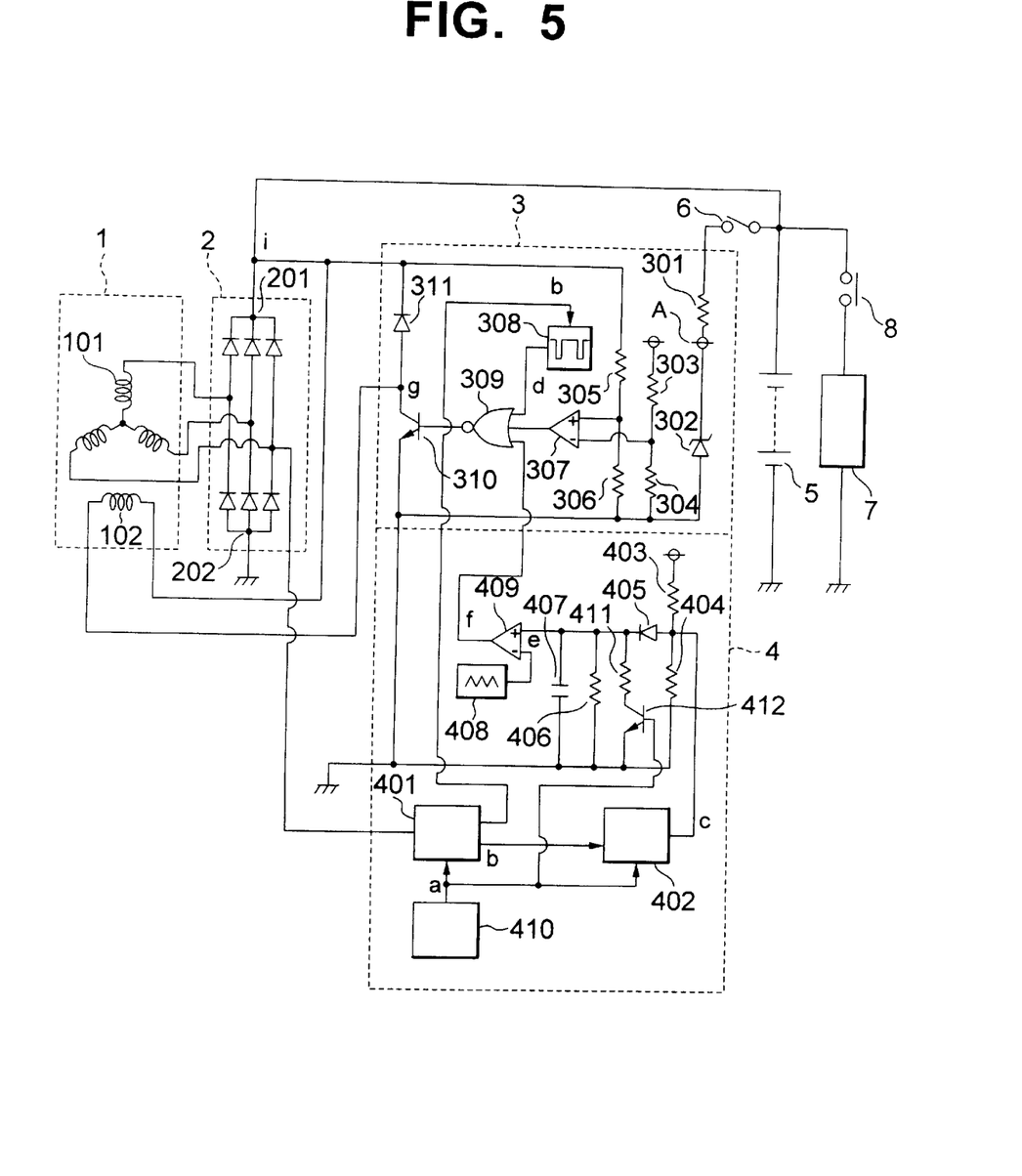
FIG. 5 is a circuit diagram showing a further embodiment of a control device of an a.c. generator for a vehicle according to the present invention.

FIG. 5 is a circuit diagram showing a further embodiment of a control device of an a.c. generator for a vehicle according to the present invention.

In this embodiment, a time (a first period of time) to suppress the output of the generator to the minimum value and a time (a second period of time) to gradually increase the output of the generator from the minimum value up to the maximum value are both changed to a short period at high temperatures. Since the time to suppress the output of the generator can be further shortened than that in the Embodiment 1, a reduction in charging the battery can be prevented when the engine is started at high temperatures.

In FIG. 5, reference numeral 411 designates a resistor connected in parallel with the capacitor 407 and the resistor 406, respectively, for discharging the capacitor 407, and reference numeral 412 designates a transistor for controlling the resistor 411, the operation of which is controlled on the basis of the output of the temperature sensor 410.

Since at low temperatures, the output of the temperature sensor is turned to the high level (ON), the transistor 412 is turned off or interrupted and hence the resistor 411 does not function at all, so that the second period of time determined on the basis of the discharge time constant of the capacitor 407 becomes long.

At high temperatures, the output of the temperature sensor is turned to the low level (OFF) to make the transistor 412 conductive, allowing the resistor 411 to form, together with the resistor 406, a discharge circuit for the capacitor 407, as a consequence of which the time constant for discharging is decreased to shorten the second period of time.

In other words, for a period of time in which the transistor 412 conducts, the gradually increasing time T2 becomes short, so that the gradually increasing time is changed between the low temperatures and the high temperatures so that the low temperature startability of the engine can be made effectively compatible with the chargeability of the battery.

Moreover, at high temperatures, the set time of the timer 402 is shortened on the basis of the output of the temperature sensor 410, thereby reducing the first period of time T1 to suppress the output of the generator to the minimum value. The operating waveforms of the respective portions in the circuit shown in FIG. 5 are the same as those of Embodiment 1 shown in FIGS. 2 and 3.

In addition, at high temperatures, the threshold for the revolution detector 401 on the basis of which the start of the engine is detected is set to the low level in dependence upon the output of the temperature sensor 410, thereby shortening the initial excitation period of the generator. The operations of the respective portions of this embodiment are the same as those of Embodiment 1.

As set forth hereinabove, in a control device of an a.c. generator for a vehicle wherein for a first period of time after the a.c. generator has started to revolve, the output of the generator is suppressed to a minimum value, and for a second period of time following the first period of time, the output of the generator is gradually increased from the minimum value up to a maximum value, the present invention is designed in such a way that at high temperatures, at least one of the first period of time and the second period of time is shortened. Therefore, the period of time required to suppress the generator output right after the engine having been started at high temperatures can be shortened and hence a reduction in the charging performance of the battery can be prevented.

In addition, right after the engine having been started at low temperatures, the output of the generator is suppressed to the minimum value for the first period of time and then is increased from the minimum value up to the maximum value for the second period of time following the first period of time. As a result, when the engine is started at low temperatures, the revolution of the engine can be stabilized by excluding the load torque due to the driving of the generator, and the generation of belt slipping noise and the reduction of engine revolution can be prevented without drastically increasing the engine load, the startability of the engine can be improved.

Further, according to the present invention, the threshold for the engine rpm on the basis of which the start of the engine is detected is set to the low level at high temperatures, the initial excitation period of the generator can be shortened and the period of time for suppressing the output of the generator can also be reduced.

What is claimed is:

1. A control device of an a.c. generator for a vehicle, said control device comprising: an a.c. generator having a field coil; a rectifier for rectifying an a.c. output of said a.c. generator; a battery connected to an output terminal of said rectifier; a voltage regulator having a switch for controlling a current flowing through said field coil and serving to detect a terminal voltage of said rectifier to intermittently control the field current by means of said switch to regulate an output voltage of said a.c. generator at a predetermined value; and a field current controller for controlling the conducting rate of said switch to a minimum setting value for a first period of time after said a.c. generator has started power generation, said controller being operable to gradually increase a setting value of the conducting rate from the minimum setting value up to a maximum setting value for a second period of time and to shorten at least one of the first period of time and the second period of time when the temperature is equal to or higher than a fixed value.

2. A control device of an a.c. generator for a vehicle according to claim 1, wherein said field current controller shortens both of the first period of time and the second period of time.

3. A control device of an a.c. generator for a vehicle, said control device comprising: an a.c. generator having a field coil; a rectifier for rectifying an a.c. output of said a.c. generator; a battery connected to an output terminal of said rectifier; a voltage regulator having a switch for controlling a current flowing through said field coil and serving to detect a terminal voltage of said rectifier to intermittently control the field current by means of said switch to regulate an output voltage of said a.c. generator at a predetermined value; and a field current controller for controlling a conducting rate of said switch in such a way to make the field current to an initial exciting current until the rpm of an engine reaches a threshold, to make the conducting rate of said switch to a minimum setting value for a first period of time after the rpm of the engine has reached the threshold, to gradually increase the setting value of the conducting rate from the minimum setting value up to a maximum setting value for a second period of time, and to set the threshold to a low level when the temperature is equal to or higher than a fixed value.

4. A control device of an a.c. generator for a vehicle, said control device comprising: an a.c. generator having a field coil; a rectifier for rectifying an a.c. output of said a.c. generator; a battery connected to an output terminal of said rectifier; a voltage regulator having a switch for controlling a current flowing through said field coil and serving to detect a terminal voltage of said rectifier or said battery to intermittently control the field current by means of said switch to regulate an output voltage of said a.c. generator at a predetermined value; and a field current controller for controlling a conducting rate of said switch in such a way to make the field current to an initial exciting current when the rpm of the engine is equal to or lower than a threshold, to make the conducting rate of said switch to a minimum setting value for a first period of time after the rpm of the engine has reached the threshold, to gradually increase a setting value of the conducting rate from the minimum setting value up to a maximum setting value for a second period of time, and to set the threshold to a low level and also shorten both of the first period of time and the second period of time when the temperature is equal to or higher than a fixed value.

* * * * *